United States Patent
Powell et al.

(10) Patent No.: US 7,275,366 B2
(45) Date of Patent: Oct. 2, 2007

(54) HIGH THERMAL EFFICIENCY SELECTIVE CATALYTIC REDUCTION (SCR) SYSTEM

(75) Inventors: John G. Powell, Santa Clarita, CA (US); Salvador Caro, Camarillo, CA (US); Henning Ottsen, Ventura, CA (US)

(73) Assignee: Advanced Cleanup Technologies, Inc., Rancho Dominguez, CA (US)

( * ) Notice: Subject to any disclaimer, the term of this patent is extended or adjusted under 35 U.S.C. 154(b) by 0 days.

(21) Appl. No.: 10/941,731

(22) Filed: Sep. 14, 2004

(65) Prior Publication Data
US 2006/0053775 A1    Mar. 16, 2006

(51) Int. Cl.
- F01N 3/00 (2006.01)
- F01N 3/10 (2006.01)
- F01N 5/02 (2006.01)

(52) U.S. Cl. .............. 60/320; 60/286; 60/288; 60/295; 60/296; 60/298; 60/301

(58) Field of Classification Search .......... 60/288, 60/282, 286, 295, 296, 298, 301
See application file for complete search history.

(56) References Cited

U.S. PATENT DOCUMENTS

| | | | |
|---|---|---|---|
| 4,756,359 A * | 7/1988 | Greer | 165/43 |
| 4,912,928 A * | 4/1990 | Kaneko et al. | 60/298 |
| 5,603,215 A * | 2/1997 | Sung et al. | 60/274 |
| 5,827,490 A * | 10/1998 | Jones | 423/239.1 |
| 6,176,082 B1 * | 1/2001 | Shaffer | 60/321 |
| 6,442,933 B2 * | 9/2002 | Rusch | 60/286 |
| 6,647,711 B1 | 11/2003 | Spiegel et al. | 60/288 |
| 6,660,239 B2 | 12/2003 | Nagji | 423/245.3 |
| 6,667,011 B1 | 12/2003 | Munje et al. | 422/173 |
| 6,761,868 B2 * | 7/2004 | Brooks et al. | 423/358 |
| 2004/0144080 A1 * | 7/2004 | Suzuki et al. | 60/276 |
| 2004/0163377 A1 * | 8/2004 | Liu | 60/275 |

* cited by examiner

*Primary Examiner*—Thomas Denion
*Assistant Examiner*—Loren Edwards
(74) *Attorney, Agent, or Firm*—Kenneth L. Green; Edgar W. Averill, Jr.

(57) ABSTRACT

An emissions control system utilizes otherwise wasted heat to efficiently reduce emissions in a main exhaust flow. Heat stored in exhaust from an auxiliary generator (i.e., auxiliary exhaust) may be used to convert urea to ammonia used by a Selective Catalytic Reducer (SCR) system, and/or the auxiliary exhaust may be used to heat the main exhaust flow before entry into an SCR. Additionally, a heat exchanger may be used to transfer heat from a hot clean flow out of the SCR, to the main exhaust flow entering the SCR. Previously, mobile emissions control systems have not used SCR systems to reduce NOx because of the cost and space required for heater fuel. The efficient use of otherwise wasted heat reduces fuel cost and fuel storage requirements, and thereby makes an SCR systems feasible for use in mobile emissions control systems.

20 Claims, 4 Drawing Sheets

HIGH THERMAL EFFICIENCY SELECTIVE CATALYTIC REDUCTION (SCR) SYSTEM

BACKGROUND OF THE INVENTION

The present invention relates to improving the efficiency of emissions control equipment, and more particularly to a use of auxiliary generator exhaust to provide heat required for emissions control processes.

A variety of activities produce exhaust having harmful levels of emissions (or pollution.) Large stationary emissions sources may have co-located emissions control systems. However, some emissions sources are mobile, and require similarly mobile emissions control systems. An example of a significant mobile emissions source is an ocean going vessel. A single container ship may produce as much emissions as 12,500 automobiles. U.S. patent application Ser. No. 10/835,197 for "Maritime Emissions Control System," assigned to the assignee of the present invention, describes a mobile emissions control system which may be transported to a ship within a harbor, and which mobile emissions control system captures and processes a main exhaust flow from the ship to reduce emissions. The main exhaust flow may be from the ship's engine(s), auxiliary generators, or any other source of exhaust from the ship. The emissions control system of the '197 patent includes a bonnet which is lowered over the ship's stack, and a rather long duct for carrying the main exhaust flow from the ship's stack to emissions processing equipment carried by a barge alongside the ship. As a result of the distance the main exhaust flow must travel before reaching the emissions processing equipment, the temperature of the main exhaust flow is much lower that it's temperature upon being exhausted from an engine or engines. The '197 applications is herein incorporated by reference.

The emissions control system processing equipment described in the '197 patent includes a first system for reduction of nitrogen oxides (NOx) as its primary purpose. The first system comprises four stages. The first stage comprises a Pre Conditioning Chamber (PCC) quench vessel. The second stage comprises oxidation column. The third stage comprises reduction column. The fourth stage comprises a caustic (or polishing) column.

Although a preferred system for reducing NOx emissions is a Selective Catalytic Reducer (SCR) system, the first system does not include an SCR system because using known SCR systems would require the addition of substantial heat. The main exhaust flow would require heating to a high temperature before introduction into the SCR system. Also, ammonia used by SCR systems is preferably generated by heating urea. The cost and space required for an energy source for heating, made such known SCR systems impractical for a mobile emissions control system.

BRIEF SUMMARY OF THE INVENTION

The present invention addresses the above and other needs by providing an emissions control system utilizing otherwise wasted heat to efficiently reduce emissions in a main exhaust flow. Heat stored in exhaust from an auxiliary generator (i.e., auxiliary exhaust) may be used to convert urea solution ammonia used by a Selective Catalytic Reducer (SCR) system, and/or the auxiliary exhaust may be used to heat the main exhaust flow before entry into an SCR. Additionally, a heat exchanger may be used to transfer heat from a hot clean flow out of the SCR, to the main exhaust flow entering the SCR. Previously, mobile emissions control systems have not used SCR systems to reduce NOx because of the cost and space required for heater fuel. The efficient use of otherwise wasted heat reduces fuel cost and fuel storage requirements, and thereby makes an SCR systems feasible for use in mobile emissions control systems.

In accordance with one aspect of the invention, there is provided an emissions control system including an auxiliary generator and a reaction chamber for converting urea to ammonia. The exhaust from the auxiliary generator is ducted into the reaction chamber to provide heat for conversion of the urea to ammonia. A Selective Catalytic Reducer (SCR) system is used to processes a combination of a main exhaust flow from the stack of a ship and the ammonia. The emissions control system may further include a heat exchanger loop between the output and the input of the SCR for pre-heating the main exhaust flow. The heat exchanger loop preferably uses a liquid for conducting heat between the heat exchangers.

In accordance with another aspect of the present invention, there is provided a method for reducing the energy required to operate an SCR system. The method includes capturing hot exhaust gases of an auxiliary engine and mixing the hot exhaust gases with an atomized urea solution to convert the urea to ammonia. A main exhaust flow from the stack of a ship is collected for processing by the SCR system. The ammonia is mixed with main exhaust flow, and the resulting mixture is processed in an SCR to reduce NOx emissions. The method may further include capturing heat from the cleaned flow out of the SCR in a heat exchanger hot side, and releasing heat into the mixed flow at a heat exchanger cold side. The use of the hot exhaust gases from the auxiliary engine to convert the urea to ammonia, and the use of the heat exchanger to heat the mixture of ammonia and main exhaust flow, substantially reduces the cost of using the SCR system to reduce NOx emissions.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

The present invention provides a system and method for improving emissions control for engine exhaust, chemical process plants, or other pollution sources. The emissions control system and method according to the present invention provides more efficient operation of an emissions control system. The present invention is particularly useful where energy sources used to generate heat or power required for operation of the emission control system are not available or are inadequate, or where providing such sources of energy is not cost effective.

Figure 1:
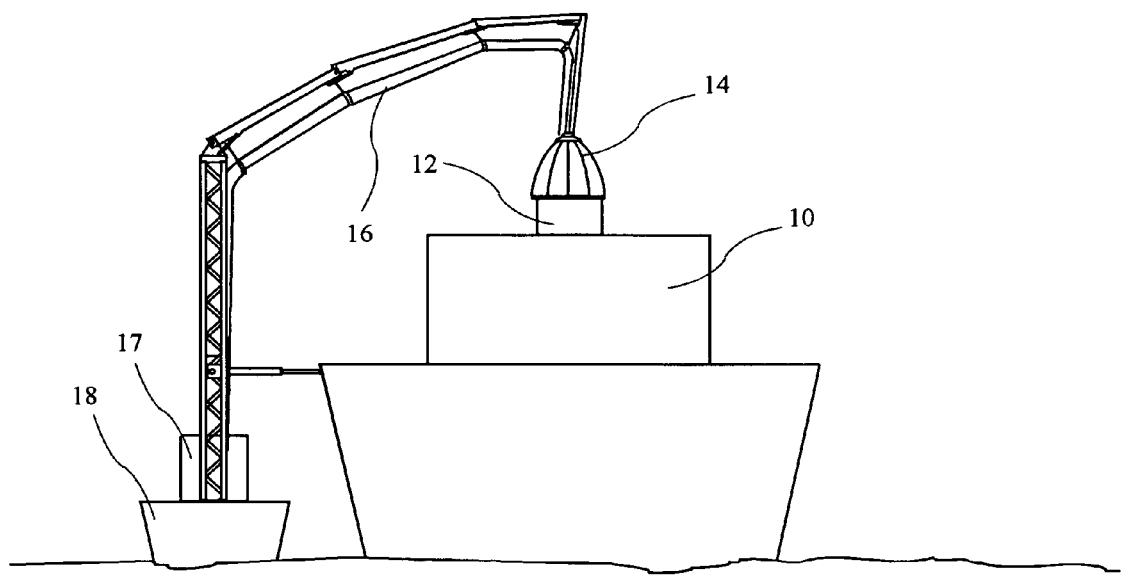
FIG. 1 is a maritime emissions control systems suitable for application of the efficient emissions control system of present invention.

A maritime emissions control system for reducing emissions from a ship 10 is shown in FIG. 1. A bonnet 14 is positioned over the ship stack 12 to collect a main exhaust flow. The main exhaust flow may be from the ship's engine (s), auxiliary generators, or any other source of exhaust from the ship. The main exhaust flow passes through a duct 16 to an emissions processing equipment 17 residing on a barge or smaller ship 18. Such maritime emissions control system is described in U.S. patent application Ser. No. 10/835,197 for "Maritime Emissions Control System," incorporated by reference above. Because of the long path from the sources, for example a ship engines or power generating equipment, the main exhaust flow is substantially cooled by the time the main exhaust flow reaches the emissions processing equipment 17.

A preferred method of reducing the emissions in exhaust includes a Selective Catalytic Reduction (SCR) system. SCR systems generally use ammonia derived from urea to supplement the catalytic reaction—in essence, giving nitrogen oxides the "extra" molecules needed to convert to harmless nitrogen and water. Such systems have proven very useful and effective.

Figure 2:
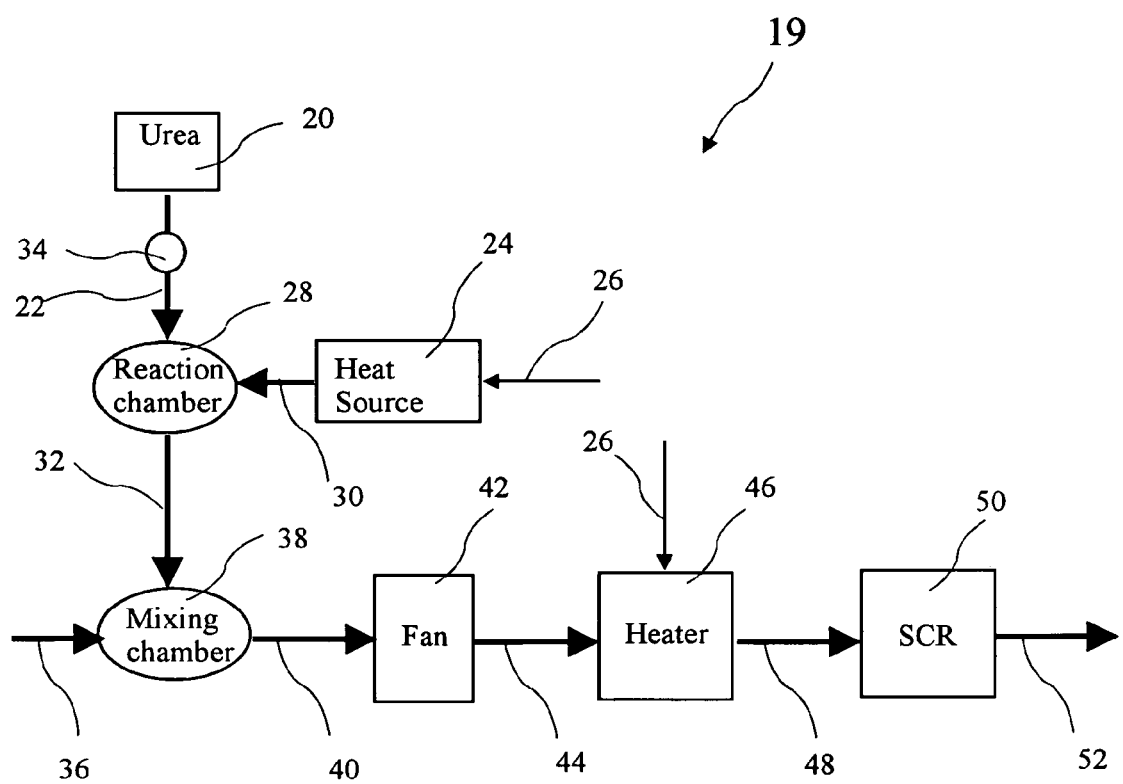
FIG. 2 depicts a prior art Selective Catalytic Reducer (SCR) system.

A prior art Selective Catalytic Reducer (SCR) system 19 for reducing NOx emissions is shown in FIG. 2. The SCR system 19 comprises a urea source 20 for providing a flow of a urea solution 22 atomized and pumped by a compressor 34 into a reaction chamber 28. A heat source 24 generates a heat flow 30 using energy 26, which heat flow 30 is also provided to the reaction chamber 28 to heat the flow of urea solution 22 to generate ammonia. A resulting gaseous ammonia flow 32 passes into a mixing chamber 38 to mix with a main exhaust flow 36. A mixed flow 40 is urged forward by a fan 42 to create an urged flow 44 to a heater 46. The heater 46 heats the urged flow 44 to create a heated flow 48 into an SCR 50. The heater 46 is preferably a duct burner, and preferably uses the same fuel as a generator within the SCR system 19, and more preferably uses the same diesel fuel as a diesel generator within the SCR system 19. The heater 46 also received the energy 26. A chemical reaction in the SCR 50 between the ammonia and the NOx converts the NOx to nitrogen gas and water in a clean flow 52.

The prior art SCR system 19 thus requires the following energy inputs in order to perform its function: energy 26 to produce the heat flow 30 to convert urea to ammonia, power to atomize and inject the urea solution into the reaction chamber 28, power for the fan 42 to urge the mixed flow 40 through heater 46 and through the SCR 50, energy 26 for the heater 46 to raise the temperature of the ammonia and main exhaust flow 36 mixture to the operating temperature of the SCR 50.

In summary, the prior art SCR system 19 requires energy to generate heat at different steps of the process and the prior art SCR system 19 needs electrical energy for pumps and the like. This is very typical of many industrial and power generation processes to which the present invention applies. Because of these energy requirements, the prior art SCR system 19 shown in FIG. 2 requires too much energy to be practical with a mobile emissions control system such as the maritime emissions control system of FIG. 1. In general, ammonia is derived from urea because urea is a much safer chemical than aqueous or anhydrous ammonia, and urea is easier to handle than ammonia.

Figure 3:
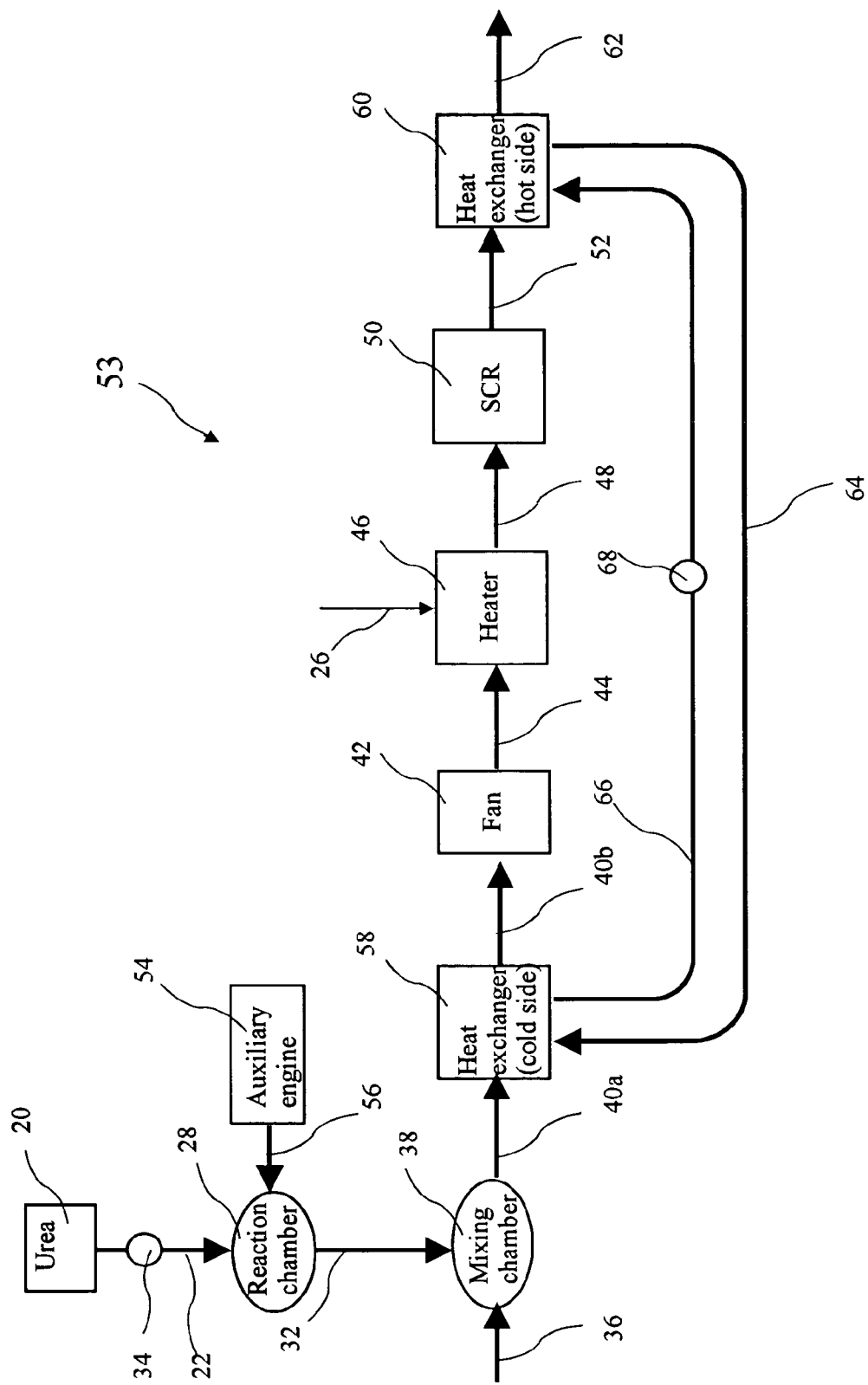
FIG. 3 shows an SCR system utilizing wasted heat according to the present invention.

An improved SCR system 53 according to the present invention is shown in FIG. 3. An auxiliary engine 54 provides auxiliary exhaust 56 as a heat source for the reaction chamber 28. The auxiliary engine 54 is preferably a diesel generator, a gas turbine generator, or a gasoline engine driven generator, and is more preferably a diesel generator, and provides power to the emissions control system. The auxiliary exhaust 56 both provides heat to convert the urea to ammonia, and remains mixed with the ammonia flow 32 to add heat to the mixed flow 40. The urea is preferable in solution, and is more preferably an approximately 35 percent to approximately 40 percent urea aqueous solution. The urea flow 22 is pumped into the reaction chamber 28 by the compressor 23, and preferably, the urea solution is atomized by compressed air from the air compressor 34 and sprayed into a flow of the hot auxiliary exhaust 56. The auxiliary exhaust 56 is typically at a temperature of approximately 1000 degrees Fahrenheit and a temperature of approximately 650 degrees Fahrenheit is required to convert urea to ammonia. The ammonia mixed with the auxiliary exhaust 56 passes into mixing chamber 38, where the ammonia mixes with the main exhaust flow 36.

The mixed flow 40b is urged forward by the fan 42 and through the heater 46 into the SCR 50. The heater 46 is preferably a duct burner, and preferably uses the same fuel as a generator within the SCR system 52, and more preferably uses the same diesel fuel as a diesel generator within the SCR system 52. The heater 46 may alternatively receive power from a generator within the SCR system 52. A chemical reaction in the SCR 50 between the ammonia and the NOx converts the NOx to nitrogen gas and water in the clean flow 52. The auxiliary exhaust 56 may further be used to preheat the SCR 50 and the heat exchangers 58, 60 before the main exhaust gas 36 is introduced into the improved SCR system 53.

Continuing with FIG. 3, the improved SCR system 52 may further include a heat exchanger for transferring heat normally exhausted from the SCR 50, and using that heat to pre heat the mixed flow into the SCR 50, thereby reducing the heating (and therefor energy) required by the heater 46. A first mixed flow 40a passes from the mixing chamber 38 to a heat exchanger cold side 58, and a second mixed flow 40b continues from the heat exchanger cold side 58 to the fan 42. The cleaned flow 52 enters a heat exchanger hot side 60 where a fluid is heated, and the cleaned flow 52 exits the heat exchanger hot side 60 as a second cleaned flow 62. The fluid flows through a rearward heat transfer tube 64 to the heat exchanger cold side 58, where heat is transferred from the fluid to the mixed flow 40a. The fluid then flows through a forward heat transfer tube 66 back to the heat exchanger hot side 60. A second pump 34b may reside in either the rearward heat transfer tube 64 or the forward heat transfer tube 66 to pump the fluid. The hot clean flow 52 is thus used to reduce the energy required by the heater 46 to heat the heated flow 48 to approximately 600 degrees Fahrenheit at entry to the SCR 50. Rather than use the typical industrial process gas-to-gas heat exchanger, the present invention preferably uses a gas-to-liquid heat exchanger, thereby increasing the heat transfer efficiency. Preferably, a heat transfer oil or fluid is used.

Selective Catalytic Reducer systems are well know and available from: Argillon LLC, Alpharetta, Ga., Babcock Power Environmental, Worchester, Mass., CRI, Inc., Houston, Tex., Englehard Corp, Iselin, N.J., Haldor-Topsoe, Houston, Tex., Mitsubishi Power Systems, Newport Beach, Calif., and Johnson Matthey, San Diego, Calif.

Figure 4:
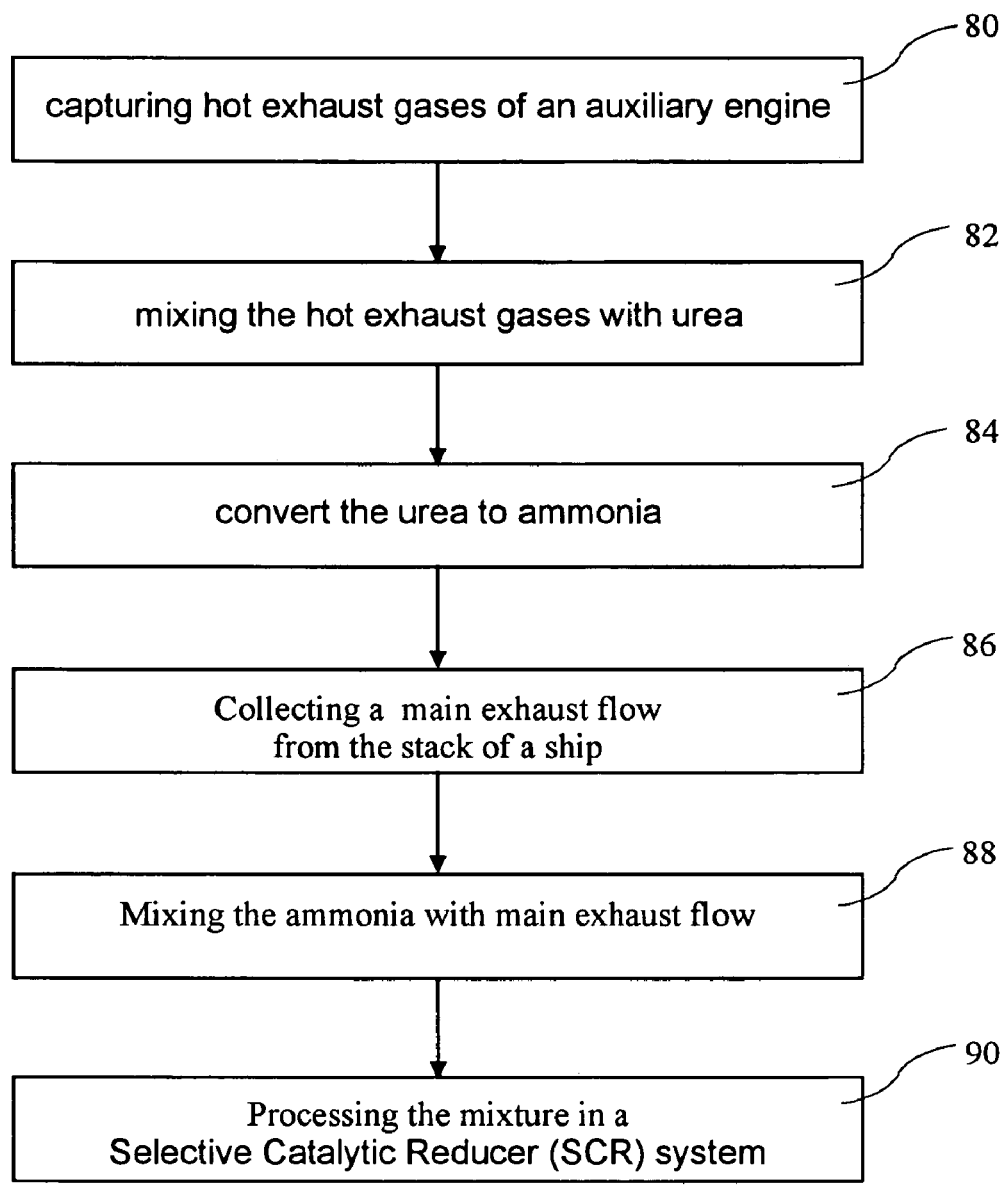
FIG. 4 is a method for processing an exhaust flow according to the present invention.

A method for processing an exhaust flow according to the present invention is described in FIG. 4. The method includes the steps of capturing hot exhaust gases of an auxiliary engine at step 80, mixing the hot exhaust gases with urea at step 82, converting the urea to ammonia at step 84, Collecting a main exhaust flow from the stack of a ship at step 86, Mixing the ammonia with main exhaust flow at step 88, and Processing the mixture in a Selective Catalytic Reducer (SCR) system at step 90. The method may further include capturing heat from the cleaned flow 52 out of the SCR 50 in a heat exchanger hot side, and releasing heat into a mixed flow 40a at a heat exchanger cold side 58.

The new and unique arrangements and processes of the present invention result in a significant reduction in the amount of energy that must be supplied for emission control system operation, and are capable of reducing the diesel fuel usage by a factor of two or three, depending on the temperature rise required for the incoming exhaust gas stream. In the particular example of FIG. 3, the incoming gas temperature may be as low as 300 degrees Fahrenheit, while the SCR requires a minimum of 600 degrees Fahrenheit for operation. With an exhaust gas flow rate of 10,000 standard cubic feet per minute (SCFM), this invention reduces the energy required for heating the exhaust and the urea by more than a factor of three.

While a system including an SCR 50 was described above, the present invention is suitable for use with any mobile system having an auxiliary engine, and requiring heating of any flow within the system, or of an element of the system. The present invention is particularly suitable to any mobile emissions control system having an auxiliary engine and requiring a heating capability, and more particularly useful for any maritime emissions control system which must be mobile and self contained.

While the invention herein disclosed has been described by means of specific embodiments and applications thereof, numerous modifications and variations could be made thereto by those skilled in the art without departing from the scope of the invention set forth in the claims.

We claim:

1. An emissions control system comprising:
  a duct placing a distal source of a main exhaust flow in fluid communication with the emissions control system;
  an auxiliary engine connected to provide power to the emissions control system and generating hot auxiliary exhaust; and
  a mixing chamber in fluid communication with the duct for receiving the main exhaust flow and in fluid communication with the auxiliary engine for receiving the hot auxiliary exhaust;
  a mixed flow generated in the mixing chamber and comprising a mixture of the main exhaust flow and the hot auxiliary exhaust, wherein the mixed flow is at a higher temperature than the main exhaust flow;
  a high temperature clean gas output flow generated by processing the mixed flow in the emissions control system, wherein the high temperature clean gas output flow is at a higher temperature than the mixed flow; and
  thermal communication for transferring heat from the high temperature clean gas output flow of the emissions control system to the mixed flow.

2. The emissions control system of claim 1, wherein the hot auxiliary exhaust is added to the main exhaust flow to pre-heat the main exhaust flow before processing by a Selective Catalytic Reduction (SCR) system.

3. The emissions control system of claim 1, wherein the thermal communication for transferring heat comprises:
  a hot side heat exchanger in thermal cooperation with the clean gas output flow;
  a cold side heat exchanger in thermal cooperation with the mixed flow;
  a pipe connecting the hot side heat exchanger to the cold side heat exchanger; and
  a fluid flowing from the hot side heat exchanger to the cold side heat exchanger through the pipe.

4. The emissions control system of claim 3, wherein the fluid is a heat transfer fluid in a liquid state.

5. The emissions control system of claim 3, further including:
  a second pipe for cycling the fluid back from the cold side heat exchanger to the hot side heat exchanger; and
  a pump for cycling the fluid between the heat exchangers.

6. The emissions control system of claim 3, wherein the main exhaust flow is the main exhaust flow collected from the stack of a ship.

7. The emissions control system of claim 1, wherein the distal source is a mobile emissions source exercising independent movement relative to the emissions control system during normal operation of the mobile emissions source.

8. The emissions control system of claim 7, wherein the mobile emissions source is a ship.

9. The emissions control system of claim 1, wherein the cooperation of the distal source and the emissions control system consists essentially of:
  positionally coupling the distal source to the emissions control system for the transfer of the main exhaust flow from the distal source to the emissions control system; and
  the transfer of the main exhaust flow from the distal source to the emissions control system.

10. A method for using waste heat generated in an emissions control system to provide heat required for operation of the emissions control system, the method comprising:
  temporarily positionally coupling a normally mobile emissions source to the emissions control system, wherein the mobile emissions source is positionally uncoupled from the emissions control system during normal operation of the mobile emissions source;
  temporarily connecting a duct between the mobile emissions source and the emissions control system to carry a main exhaust flow of the mobile emissions source to the emissions control system;
  receiving the main exhaust flow through the duct to be processed by the emissions control system to reduce emissions in the main exhaust flow, wherein the main exhaust flow travels a distance from the mobile emissions source to the emissions control system and becomes cooled and requires heating before processing by the emissions control system;
  providing power generated by an auxiliary engine to the emissions control system;
  capturing hot exhaust gases produced by the auxiliary engine;
  mixing the hot exhaust gases with the main exhaust flow to generate a mixed flow having a higher temperature than the main exhaust flow; and processing the mixed flow by the emissions control system to generate a clean gas output flow from the emissions control system.

11. The method of claim 10, further including mixing the hot exhaust gases with urea carried by the emissions control system to convert the urea to ammonia, and wherein mixing the hot exhaust gases with the main exhaust flow comprises mixing the hot exhaust gases and ammonia with the main exhaust flow to generate the mixed flow.

12. The method of claim 11, wherein processing the mixed flow by the emissions control system comprises processing the mixed flow using a Selective Catalytic Reduction (SCR) system.

13. The method of claim 10, wherein temporarily positionally coupling a normally mobile emissions source to the emissions control system comprises temporarily positionally coupling the normally mobile emissions source comprising a ship to the emissions control system.

14. The method of claim 13, wherein temporarily connecting a duct between the mobile emissions source and the emissions control system includes positioning a bonnet over a stack of the ship to capture the main exhaust flow.

15. A main exhaust flow source and an emissions control system comprising:
 a first mobile vehicle producing the main exhaust flow;
 a second mobile vehicle capable of motion independent of the first mobile vehicle and carrying the emissions control system;
 support apparatus carried by the second mobile vehicle;
 a duct carried by the support apparatus, the duct disconnectably connectable to the first mobile vehicle to place the main exhaust flow from the first mobile vehicle in fluid communication with the emissions control system carried by the second mobile vehicle, the duct having a length sufficient to result in the main exhaust flow cooling to a temperature below a processing temperature required for processing by the emissions control system;
 an auxiliary generator element of the emissions control system, the auxiliary generator carried by the second mobile vehicle and connected to provide power to the emissions control system;
 hot auxiliary exhaust produced by the auxiliary generator;
 a urea source carried by the second mobile vehicle, the urea source containing urea;
 a reaction chamber element of the emissions control system, the reaction chamber carried by the second mobile vehicle and in fluid communication with the urea source to receive the urea and in fluid communication with the auxiliary generator to receive the hot auxiliary exhaust;
 ammonia generated in the reaction chamber from the combination of the hot auxiliary exhaust and the urea;
 a mixing chamber element of the emissions control system, the mixing chamber carried by the second mobile vehicle and in fluid communication with the reaction chamber for receiving the ammonia and the hot auxiliary exhaust, and in fluid communication with the duct for receiving the main exhaust flow;
 a mixed flow generated in the mixing chamber and comprising the ammonia and the hot auxiliary exhaust mixed with the main exhaust flow;
 a Selective Catalytic Reducer (SCR) system element of the emissions control system, the SCR system carried by the second mobile vehicle and in fluid communication with the mixing chamber for processing the mixed flow to reduce emissions in the main exhaust flow.

16. The system of claim 15, wherein the support apparatus includes a moveable articulating arm reaching from the support apparatus toward the first mobile vehicle and carrying the duct for positioning the duct to disconnectably connect the duct to the first mobile vehicle to place the main exhaust flow from the first mobile vehicle in communication with the emissions control system.

17. The system of claim 16, wherein the support apparatus further includes a tower reaching upwards from the second mobile vehicle and supporting the articulating arm.

18. The system of claim 15, wherein:
 the first mobile vehicle is a ship and the main exhaust flow is an exhaust flow from engines within the ship;
 the duct connects the ship to the emissions control system carried by the second mobile vehicle; and
 the length of the duct connecting the ship to the emissions control system is sufficient to result in the main exhaust flow cooling to a temperature below a processing temperature required for processing by the emissions control system.

19. The system of claim 18, further including a bonnet attached to an end of the duct opposite the emissions control system, the bonnet is temporarily positionable over a stack of the ship to capture the main exhaust flow.

20. The system of claim 15, wherein the first mobile vehicle is an Ocean Going Vessel (OGV) producing the main exhaust flow and the second mobile vehicle is selected from the group consisting of a barge and a small ship having a deck, and the support apparatus comprises a tower residing on the deck and reaching upwards to position the duct to connect to the OGV to place the main exhaust flow from the OGV in communication with the emissions control system, and the length of the duct connecting the OGV to the emissions control system is sufficient to result in the main exhaust flow cooling to a temperature below a processing temperature required for processing by the emissions control system.

* * * * *